April 2, 1929. B. P. PHELPS 1,707,923
DROP PIT
Filed April 4, 1928 4 Sheets-Sheet 1
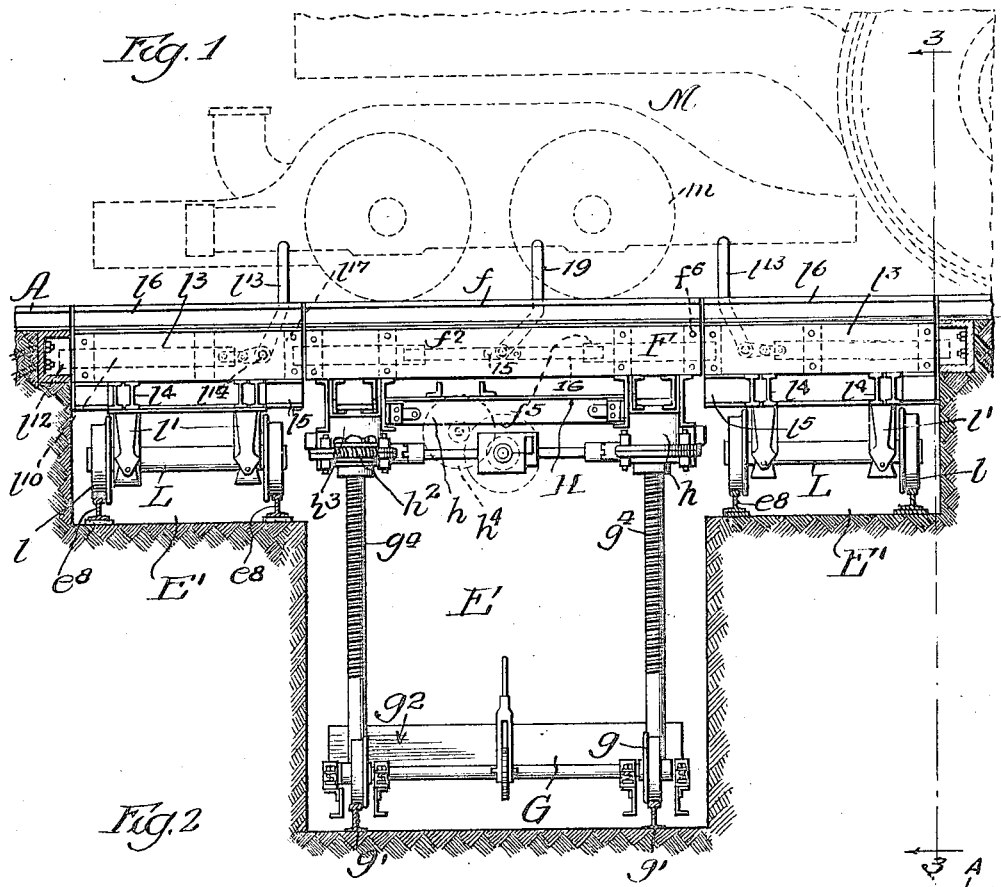

April 2, 1929. B. P. PHELPS 1,707,923
DROP PIT
Filed April 4, 1928 4 Sheets-Sheet 2
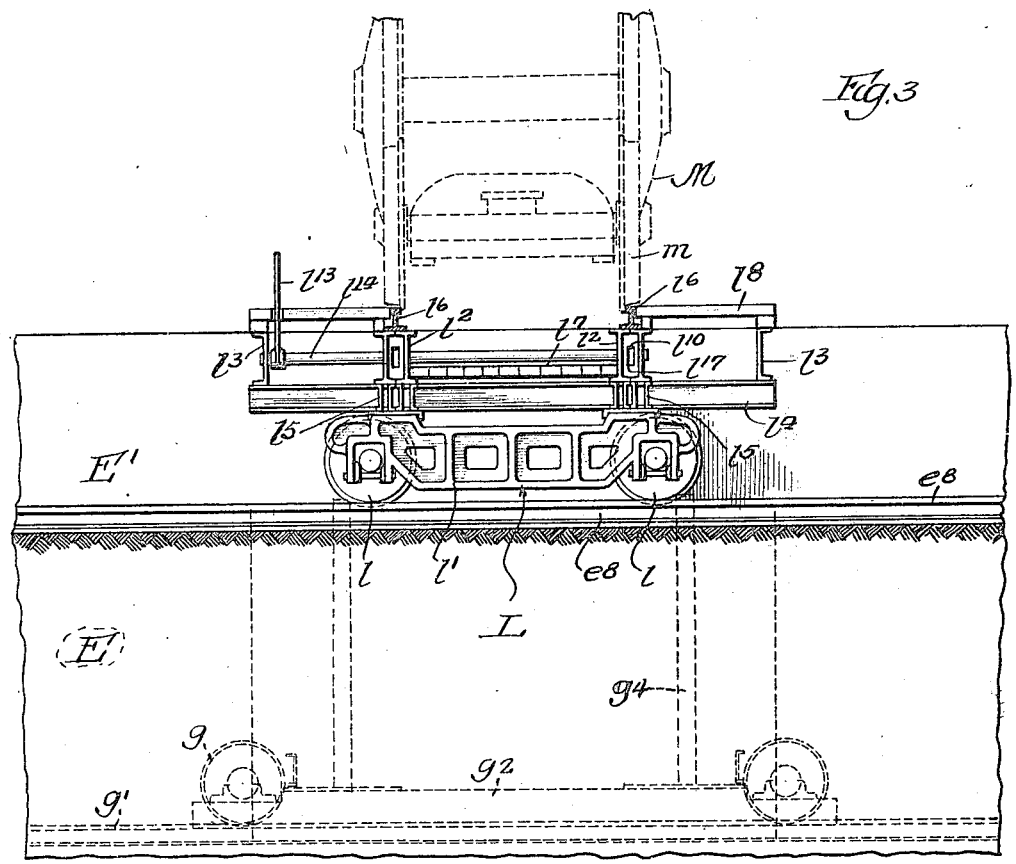
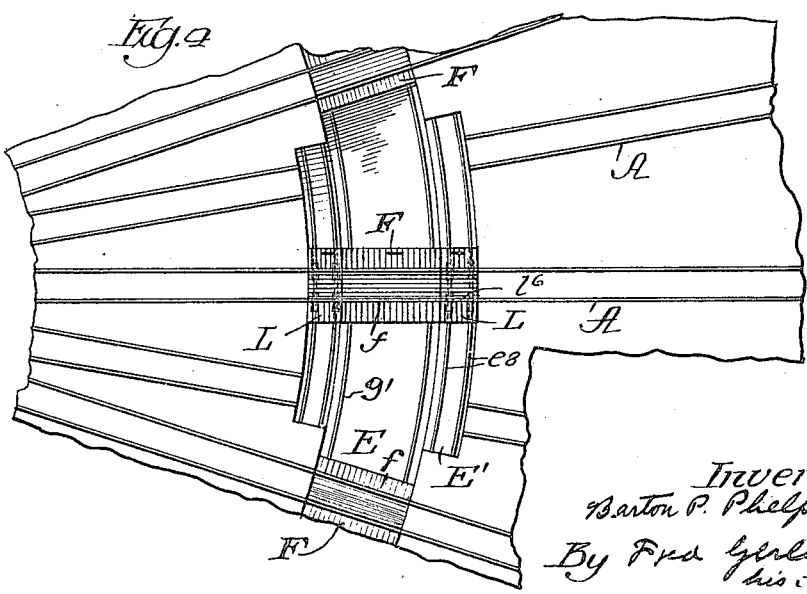
Inventor
Barton P. Phelps
By Fred Gerlach
his Atty

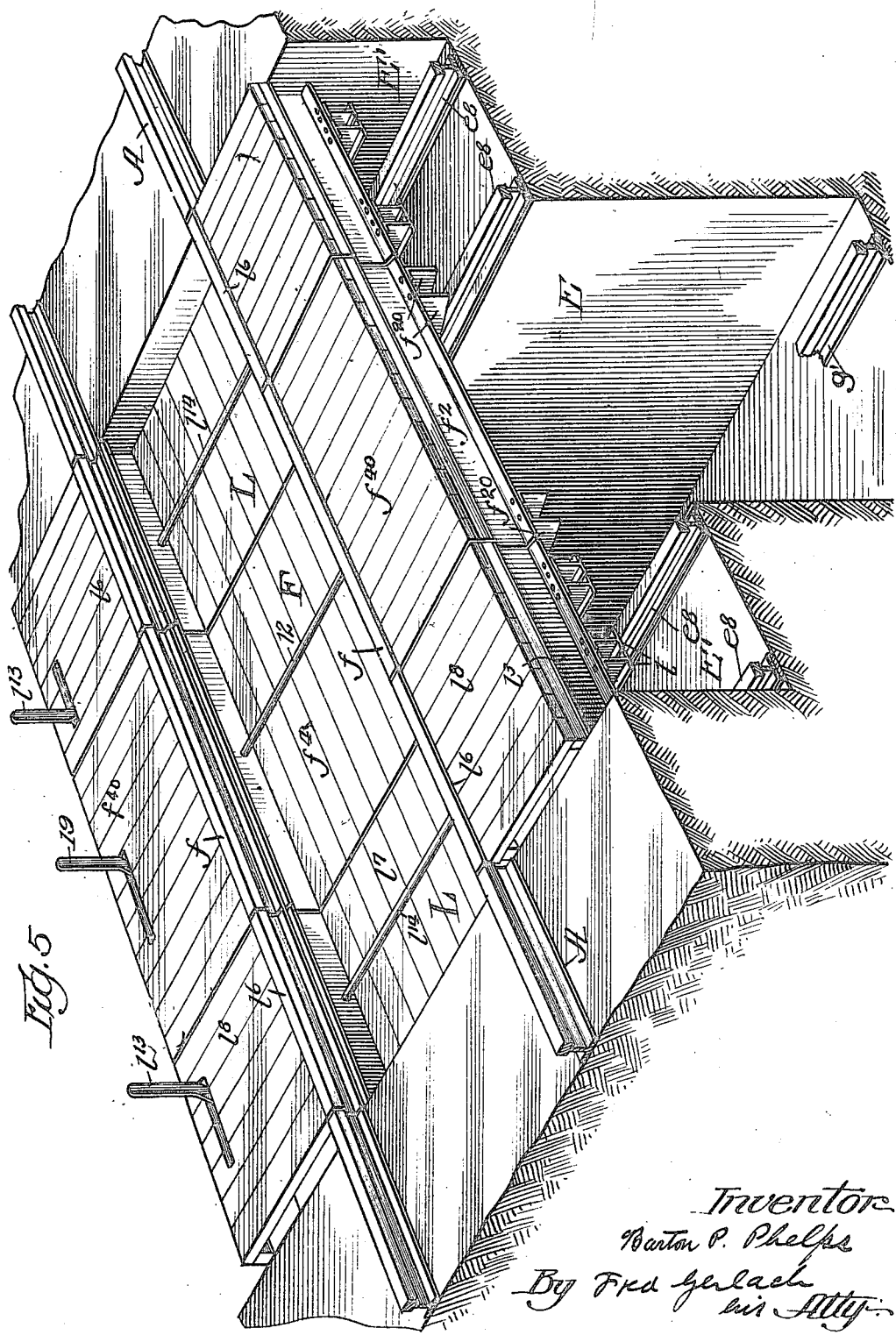

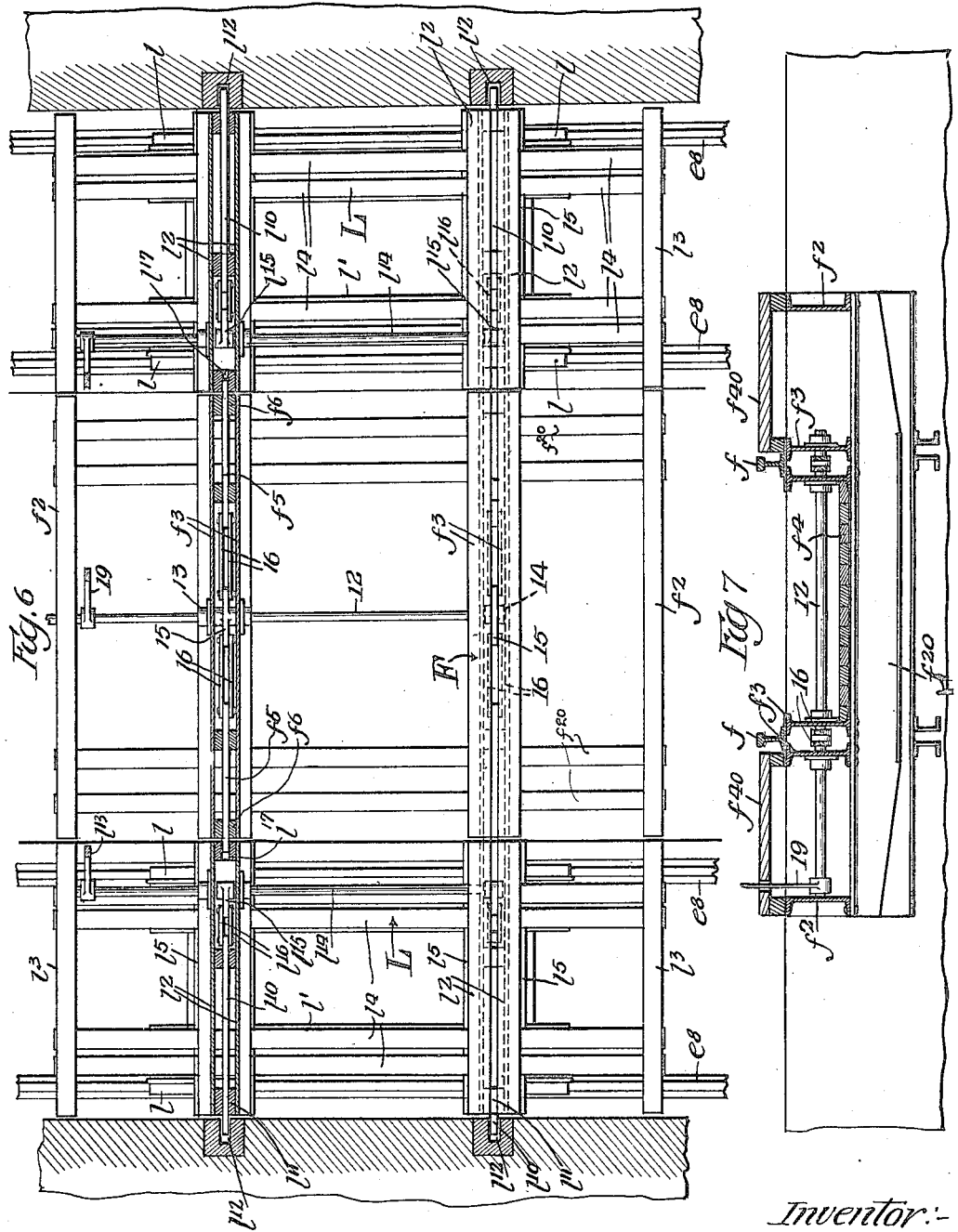

Patented Apr. 2, 1929.

1,707,923

UNITED STATES PATENT OFFICE.

BARTON P. PHELPS, OF TOPEKA, KANSAS, ASSIGNOR TO WHITING CORPORATION, OF HARVEY, ILLINOIS, A CORPORATION OF ILLINOIS.

DROP PIT.

Application filed April 4, 1928. Serial No. 267,218.

The invention relates to drop pits of the type used in connection with locomotives.

Many locomotives are now equipped with boosters which are adapted to the power of the locomotive and are carried by trucks that are separable from the locomotive. These boosters occasionally require repair or overhauling, and for this purpose it is necessary or desirable to remove the booster-truck from the locomotive for delivery to the shop for repair. It is now common practice to provide the locomotive shop with a drop pit which extends under and intersects two or more of the tracks and has associated therewith drop tables having track sections thereon bridging the top of the pit, and to transfer the tables across the pit from one track to another, so a pair of wheels, removed from a locomotive on one track, may be transported to another track so the wheels may be rolled off to the shop. In practice, these drop tables are of limited width, so that a single pair of wheels may be lowered from the locomotive while the others remain supported on the track at the sides of the pit. The booster trucks are usually of such length that they cannot be lowered into the pit, and consequently the drop pits now used for locomotive wheels cannot be used for the removal and replacement of the booster trucks.

One object of the present invention is to provide a drop pit which is adapted for use in the removal and replacement of booster trucks.

Another object of the invention is to provide an improved equipment which is usable for replacement and removal of locomotive drivers as well as booster trucks.

A further object of the invention is to provide an equipment which is adapted for the replacement and removal of booster trucks and in which the standard drop table for handling locomotive drivers may be used.

A still further object of the invention is to provide an improved equipment comprising a drop table and is usable for locomotive drivers with auxiliary trucks which are usable in conjunction with the table for handling booster trucks when desired.

Other objects of the invention will appear from the following description.

The invention consists in the several novel features hereinafter set forth and more particularly defined by the claims at the conclusion hereof.

In the drawings: Fig. 1 is a transverse section of a drop pit embodying the invention, the drop table being shown in its raised position. Fig. 2 is a similar view, with the drop table lowered, for the transfer of a booster truck, and the supplemental trucks rolled away. Fig. 3 is a longitudinal section taken on line 3—3 of Fig. 1. Fig. 4 is a plan showing the invention applied to a system of tracks. Fig. 5 is a perspective of the drop table and auxiliary trucks. Fig. 6 is a horizontal section through the locking mechanisms for the trucks and drop table. Figure 7 is a transverse sectional view of the drop table.

The invention is exemplified in an equipment, usually in a round-house, comprising a series of tracks A under which is formed an intersecting pit E. A drop table F is provided for each track, and each table has secured thereon a pair of rail sections $f$ to bridge the pit while the table is locked at the top of the pit. Each table, with its track sections, is vertically movable into and out of, and along, the pit to transfer wheels from a locomotive on one track to another track and vice versa.

Each drop table is built up of channel beams $f^2$ and I-beams $f^3$ disposed under the rail sections $f$ to support them, and cross-beams $f^{20}$, and all the beams being rigidly secured together to form a rigid rectangular structure. Each table is provided with flooring $f^4$ between the beams under the rail sections and platforms $f^{40}$ at the sides of said sections. Each table is provided with suitable locking mechanism to secure it in position to support and retain the rail-sections $f$ thereon in registry with the rails of a track terminating at the pit sides or with the ends of the auxiliary trucks hereinafter set forth. This table locking mechanism comprises four bars $f^5$ which are vertically aligned with the rail sections $f$, and are each slidably guided in blocks $f^6$, which are fixedly secured between a pair of the beams $f^3$. The outer ends of these locking bars are adapted to project from the ends of the table into the vertically extending sockets hereinafter set forth. The locking bars $f^5$ are conjointly operable by a rock-shaft 12 which extends longitudinally of the pit and is journalled in bearings 13 and 14 mounted on the table, a pair of levers 15, each provided with oppositely extending arms, and links 16 pivoted to said arms and to the locking bars respectively. An operating lever 19 is fixed to rock shaft 12 adjacent one side of the table.

A truck G for transporting the drop table along the pit and between the tracks, as well understood in the art, comprises a frame $g^2$ equipped with wheels $g$ to travel on rails $g'$ at the bottom of the pit. This truck may be of any suitable construction and is equipped with hand or power operated mechanism for propelling it. The truck G is equipped with a vertically movable carriage H for raising and lowering the drop tables. The carriage comprises a rigid frame $h$ supported by screw-threaded rods $g^4$, the lower ends of which are fixed to the truck-frame $g^2$, and worm gears $h^2$, which are confined in sectional housings $h^3$ fixed to the frame of carriage H. By conjoint rotation of gears $h^2$ the carriage and its load may be raised or lowered in the pit. These gears are conjointly operable by suitable gearing driven by an electric motor $h^4$, to rotate them to raise or lower the carriage. The carriage H is adapted to engage the underside of the drop table to support or lift it, and is movable independently of the table, as well understood in the art, and as exemplified in Letters Patent No. 1,632,256.

Adjacent each side of the pit E, there is provided an auxiliary pit or recess E' which is extended under and to intersect any desired number of tracks A. Each of these supplemental or auxiliary pits is provided with a pair of rails $e^8$ for a truck L, so that each truck may be shifted between the tracks A which are intersected by the auxiliary pits. Each truck L comprises wheels $l$ to run on the cross-rails $e^8$, side frames $l'$ carrying journal boxes for the wheel axles, and a super structure comprising transverse beams $l^5$, longitudinal beams $l^4$, channelled end beams $l^3$ and I-beams $l^2$, all of the beams being rigidly secured together to form a rigid supporting structure for rail sections $l^6$, which are secured to the tops of I-beams $l^2$, and are adapted to bridge the gap between the rail sections on the drop table and the rails of the tracks A. Flooring $l^7$ is provided between the rail sections, and platforms $l^8$ are provided at the sides of the rail-sections $l^6$. Each of these auxiliary trucks constitutes a support for the rail sections $l^6$ which is movable in one of the auxiliary pits E' to transfer said rail sections to and from a position in alignment with the drop table and between several of the tracks A.

Each truck L is equipped with locking mechanism for securing it against transverse movement to retain the rail sections $l^6$ thereon aligned with the rail sections on a drop table and one of the tracks A. This mechanism comprises a pair of bars $l^{10}$, which are slidably mounted in blocks $l^{11}$ fixed between the beams $l^2$, and adapted to be shifted into sockets $l^{12}$ fixed in the side wall of the auxiliary pit E'. These bars are operable into and out of the sockets by a lever $l^{13}$ fixed to a shaft $l^{14}$, arms $l^{15}$ fixed to said shaft, and links $l^{16}$ between said arms and the locking bars. Sockets $l^{17}$ are also fixed to each of the auxiliary truck frames to receive the outer ends of the locking bars $f^5$ which are carried by the drop tables F. By means of these locking mechanisms, the trucks L and one of the drop tables F may be secured so that the rail sections on the table and the trucks will completely bridge the gaps in the tracks A. When the locking bars are released, the auxiliary trucks may be rolled transversely of the tracks. While the locking bars $l^{10}$ are left in the sockets $l^{12}$, the drop table will be released so that it may be raised or lowered in the pit E.

The operation is as follows: When the booster M, which is generally indicated by dotted lines in Fig. 1, is to be removed from the locomotive, the auxiliary trucks L and the drop table F will be locked into position to bridge the track A on which the locomotive is located, so that the locomotive can be run over the pit. The locomotive will be run into position to bring the wheels $m$ of the booster truck frame onto the drop table, as shown in Fig. 1. In this position, the drivers of the locomotive will clear the rail sections on the auxiliary trucks. Next, the locking bars $f^5$ will be released from the auxiliary trucks, so that the trucks will be free to be moved longitudinally.

If necessary, the carriage H will then be raised a short distance to disconnect the booster truck, so the booster can be detached from the locomotive. The auxiliary trucks L are then unlocked and rolled crosswise of the track to provide a space into which the booster can be lowered away from the locomotive. Next, the drop table is lowered into position indicated in Fig. 2. The carriage H will then be operated in the pit to transport the drop table with the booster thereon into alignment with the rails of an adjacent track A. Then, the drop table will be raised to bring the booster approximately to the track level. The auxiliary trucks L are then wheeled into position to bring the rail sections thereon into alignment with the rail sections on the drop table, and the rails of the track A. The locking bars $f^5$ are then operated to lock the drop table and trucks together and the locking bars $l^{10}$ are operated to lock the auxiliary trucks against movement transversely to the rails. The gap in the track A will then be completely bridged by the rail sections on the auxiliary trucks and the drop table, so that the booster truck may be rolled off to the desired point in the shop. When the booster is to be replaced on the locomotive, it is rolled onto the drop table while the latter and the auxiliary trucks are locked together. The auxiliary trucks are then released and rolled away from the drop table. The latter, with the booster thereon, will then be lowered and then transported into position under the locomotive on an adjacent track, and elevated into position to be secured to the locomotive. The auxiliary trucks are then rolled into position to bring their rail sections in alignment with the rail sections on the drop table, and locked in position so that the gap over the pit will be completely bridged to permit the locomotive to be run over the pit and into the desired place. When a pair of locomtive drivers is to be removed from the locomotive, the drop table and auxiliary tracks will be locked together and to the walls of the pit while the locomotive is run into position to bring the drivers onto the drop table. Then the locking bars $f^5$ are released from the auxiliary trucks and the latter are left locked in position. The drop table will then be hoisted slightly to disconnect the drivers, so they can be released and then lowered into the pit E for transfer to another track, so they can be rolled to the desired place in the shop.

When the drop table and trucks are locked, the lifting mechanism may be lowered and the carriage used in any portion of the pit. While the tables in the pit and the trucks are locked, the table will be supported from the trucks, so that the rail sections will completely bridge the pit E and recesses E' so locomotives may run over the pit.

The invention exemplifies a drop pit which is equipped and adapted for the removal and replacement of booster trucks, and which is also operable to handle locomotive drivers. In this equipment, the drop table used for drivers is utilized in handling booster trucks, so that separate equipment for boosters and drivers are not necessary.

The invention is not to be understood as restricted to the detail set forth, since these may be modified within the scope of the appended claims, without departing from the spirit and scope of the invention.

Having thus described the invention, what I claim as new and desire to secure by Letters Patent, is:

1. In an equipment of the character described, the combination with a pit, of a drop table adapted to be raised and lowered in the pit, a truck movable into and out of position at one side of the table, and rail-sections on the table and the truck.

2. In an equipment of the character described, the combination with a pit having a recess along one side thereof, of a drop table adapted to be raised and lowered in the pit, and a wheeled truck in the recess and movable into and out of position at one side of the table to permit a booster to be lowered into the pit for transfer.

3. In an equipment of the character described, the combination with a pit having a recess along one side thereof, of a drop table adapted to be raised and lowered in the pit, a wheeled truck in the recess and movable into and out of position at one side of the table to permit a booster to be lowered into the pit for transfer, and rail-sections on the table and the truck.

4. In an equipment of the character described, the combination with a pit, of a drop table adapted to be raised and lowered in the pit, a truck movable into and out of position at one side of the table to permit a booster to be lowered into the pit for transfer, rail-sections on the table and the truck, and means for locking the truck against lateral movement relatively to the table.

5. In an equipment of the character described, the combination with a pit, of a drop table adapted to be raised and lowered in the pit, and a pair of trucks at the sides of and movable transversely relatively to the table to permit a booster on the table to be lowered into the pit.

6. In an equipment of the character described, the combination with a pit having recesses along the sides thereof, of a drop table adapted to be raised and lowered in the pit, and a pair of trucks in the recesses and movable transversely relatively to the table.

7. In an equipment of the character described, the combination with a pit having recesses along the sides thereof, of a drop table adapted to be raised and lowered in the pit, a pair of trucks in the recesses and movable transversely relatively to the table to permit a booster on the table to be lowered into the pit, and rail sections on the table and the trucks to bridge the pit and recesses.

8. In an equipment of the character described, the combination with a pit having recesses along the sides thereof, of a drop table adapted to be raised and lowered in the pit, a pair of trucks in the recesses and movable transversely relatively to the table, and means for locking the table to the trucks so it will be supported thereby.

9. In an equipment of the character described, the combination with a pit, of a drop table adapted to be raised and lowered in the pit, a pair of trucks at the sides of, and movable transversely relatively to, the table, to permit a booster on the table to be lowered into the pit, rail sections on the table and the trucks, and means for locking the trucks against lateral movement.

10. In an equipment of the character described, the combination with a pit, of a drop table, a carriage movable in the pit, mechanism on the carriage for raising and lowering the drop table, a truck at the side of and movable transversely of the table, and rail sections on the truck and table.

11. In an equipment of the character described, the combination with a pit, of a drop table, a carriage movable in the pit, mechanism on the carriage for raising and lowering the drop table, trucks at the sides of and movable transversely of the table, rail sections on the trucks and table to bridge the pit, and means for locking the table to the trucks.

12. In an equipment of the character described, the combination with a pit, of a drop table, a carriage movable in the pit, mechanism on the carriage for raising and lowering the drop table, a truck at one side of and movable transversely of the table, rail-sections on the truck and table, means for locking the truck in the pit, and means for locking the table to the truck.

13. In an equipment of the character described, the combination with a pit, of a drop table, a carriage movable in the pit, mechanism on the carriage for raising and lowering the drop table, trucks at the sides of and movable transversely of the table, rail sections on the trucks and table to bridge the pit, means for locking the trucks in the pit, and means for locking the table to the trucks.

14. In an equipment of the character described, the combination with a pit having a recess along one side thereof, of a drop table, mechanism for raising and lowering the table in the pit, separable from the table, a wheeled truck adapted to travel in the recess and longitudinally of the pit, rail-sections on the truck and the drop table to bridge the pit and the recess, and means for locking the table to the truck and the truck in the recess in their bridging position.

15. In an equipment of the character described, the combination with a pit having recesses along the sides thereof, of a drop table, mechanism for raising and lowering the table in the pit, separable from the table, trucks adapted to travel in the recesses and longitudinally of the pit, rail-sections on the trucks and the drop table to bridge the pit and the recesses, means for locking the trucks in the recesses, and means for locking the drop table to the trucks so it will be supported thereby.

Signed at Chicago, Illinois, this 24th day of March, 1928.

BARTON P. PHELPS.